United States Patent
Kaylo et al.

(10) Patent No.: US 6,641,707 B2
(45) Date of Patent: Nov. 4, 2003

(54) BIODEGRADATION-RESISTANT ELECTRODEPOSITABLE COATING COMPOSITIONS AND METHODS RELATED THERETO

(75) Inventors: Alan J. Kaylo, Glenshaw, PA (US); Gregory J. McCollum, Gibsonia, PA (US); Steven R. Zawacky, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 212 days.

(21) Appl. No.: 09/855,975

(22) Filed: May 15, 2001

(65) Prior Publication Data

US 2003/0000837 A1 Jan. 2, 2003

(51) Int. Cl.$^7$ .................................................. C08F 2/58
(52) U.S. Cl. ..................... 204/505; 204/506; 523/415
(58) Field of Search ............................... 204/505, 506; 523/415

(56) References Cited

U.S. PATENT DOCUMENTS 5,658,660 A * 8/1997 Teshima et al. ............ 428/334

6,017,431 A 1/2000 Augustini et al. .......... 204/499

* cited by examiner

Primary Examiner—Kishor Mayekar
(74) Attorney, Agent, or Firm—Deborah M. Altman

(57) ABSTRACT

Provided is a biodegradation resistant cationic electrodeposition composition of a resinous phase dispersed in an aqueous medium. The resinous phase includes an electrodepositable resin having cationic onium salt groups which have been at least partially solubilized with an α-alkoxycarboxylic acid of formula (I),

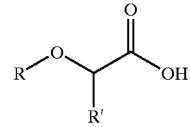

(I)

where R is $C_1$ to $C_6$ alkyl or aryl and R' is H or $C_1$ to $C_2$ alkyl. Also provided is a method of electrocoating a conductive substrate serving as a cathode in an electrical circuit where the cathode and an anode are immersed in an aqueous electrodeposition bath containing the biodegradation resistant cationic electrodepositable composition described above, and substrates coated by the method.

32 Claims, No Drawings

BIODEGRADATION-RESISTANT ELECTRODEPOSITABLE COATING COMPOSITIONS AND METHODS RELATED THERETO

FIELD OF THE INVENTION

The present invention relates to cationic electrodepositable compositions and, more particularly, to cationic electrodepositable compositions that are resistant to effects of biodegradation.

BACKGROUND OF THE INVENTION

Electrodeposition as a coating application method involves deposition of a film-forming composition under the influence of an applied electrical potential. Advantages of electrodeposition over non-electrophoretic coating processes include increased paint utilization, outstanding corrosion protection and low environmental contamination. Since its introduction in 1972, cationic electrodeposition has steadily gained in popularity over anionic electrodeposition and today is by far the most prevalent method of electrodeposition. Throughout the world, more than 80 percent of all motor vehicles produced are given a primer coating by cationic electrodeposition.

In preparing the electrodepositable composition used in the cationic electrodeposition process, a resinous binder which contains basic groups, such as basic nitrogen groups, is neutralized with an acid. The resultant cationic resin is dispersed in water and combined with pigment and other additives normally used in the cationic electrodeposition process to form a paint. The neutralizing acids may include organic acids such as acetic acid and lactic acid as well as inorganic acids such as sulfamic.

The electrodeposition process involves immersing an electroconductive substrate into a bath of an aqueous electrocoating composition, the substrate serving as a charged electrode in an electrical circuit comprising the electrode and an oppositely charged counter-electrode. In the case of a cationic electrocoat composition, the workpiece serves as a cathode. Sufficient electrical current is applied between the electrodes to deposit a substantially continuous, adherent film of the electrocoating composition onto the surface of the electroconductive substrate. The electrocoated substrate is then conveyed to a rinsing operation where it is rinsed with an aqueous rinsing composition. Typical rinsing operations have multiple stages which can include closed loop spray and/or dip applications such as are described below. For example, in a spray rinse application the electrocoated substrate exits the electrocoating tank and is conveyed over a rinse tank while an aqueous rinsing composition is spray applied to the electrocoated surfaces of the substrate. Excess rinsing composition is permitted to drain from the substrate into the rinse tank below. The rinsing composition is then recirculated to the spraying apparatus for subsequent spray applications.

Recirculating the coating or rinsing compositions is both economically and environmentally desirable. However, the combination of organic nutrients, warmth, aeration and recirculation in an aqueous coating system creates an environment conducive to bacterial and fungal growth. These microorganisms, if left unchecked, can adversely affect the quality and appearance of the electrodeposited coating. Microorganisms present in the coating or rinsing compositions can cause pH shifts, particulate "dirt" deposition and biofouling, which detrimentally affect the appearance of the coating and reduce system performance. Organic acids, such as lactic and acetic acids, commonly used to neutralize the basic groups of the cationic electrodeposition composition, for such microorganisms are a major nutrient source.

Also, ethylene glycol ether alcohols can suppress microorganism growth in electrocoating compositions, but are undesirable ecologically.

A microbiocide composition containing a mixture of 5-chloro-2-methyl-4-isothiazolin-3-one and 2-methyl-4-isothiazolin-3-one (commercially available as KAYTHON® LX from Rohm and Haas Co.) has been used commercially in electrodeposition coatings and rinse compositions as the sole microorganism control composition. Although effective for inhibiting and/or controlling the growth of microorganisms in such systems, this microbiocide is relatively expensive and can cause a rougher appearance than a coating composition without this microbiocide. Moreover, such microbiocide compositions can contain, as inert ingredients, metal salts such as magnesium nitrate and magnesium chloride. The presence of metal ions of these salts in electrodeposition systems is undesirable because the metals can cause coating defects due to gas generation at the cathode. Furthermore, such a microbiocide typically is not included as a component in the coating composition, but, rather, is added to the electrodeposition system in an assembly plant setting. Microbiocides can lose their effectiveness over time as they are depleted from the bath and constant replenishment is necessary. Moreover, some of the microbiocides discussed above can require special handling and disposal means.

U.S. Pat. No. 6,017,431 discloses sulfamic acid (an inorganic acid) as a neutralizing agent for cationic electrocoating compositions and for the adjustment of pH of the electrodeposition bath compositions containing these compositions. Such electrodeposition baths are more resistant to the adverse effects of microorganism growth when the amount of sulfamic acid in the electrodepositable composition is greater than 90 up to 100 equivalent weight percent. However, due to certain processing issues which can arise during the preparation of electrodeposition composition components containing sulfamic acid as the neutralizing agent, the inclusion of an organic acid in such electrodepositable compositions often is desirable. As mentioned above, however, organic acids, which are present to rectify these difficulties, can be consumed by bacteria. Moreover, in such cases, the indigestible sulfamic acid can be post-added to the electrodepositable composition to replace the organic acids consumed by bacteria.

In view of the foregoing, a need exists for an inherently biodegradation resistant electrodepositable coating composition that requires minimal maintenance. The elimination of the necessity to handle toxic microbiocides that often are used in electrodeposition baths neutralized with organic acids is also desirable. It was surprising to find that cationic electrodeposition compositions containing certain α-alkoxycarboxylic acids exhibit improved resistance to biodegradation with use of little or no microbiocide.

SUMMARY OF THE INVENTION

In accordance with the present invention, a biodegradation resistant cationic electrodeposition composition is provided. The biodegradation resistant cationic electrodeposition composition comprises a resinous phase dispersed in an aqueous medium. The resinous phase comprises an electrodepositable resin having cationic onium salt groups which have been at least partially solubilized with an α-alkoxycarboxylic acid of formula (I),

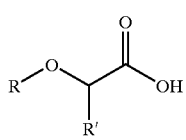

where R is $C_1$ to $C_6$ alkyl or aryl and R' is H or $C_1$ to $C_2$ alkyl.

Also provided is a method of electrocoating a conductive substrate serving as a cathode in an electrical circuit comprising the cathode and an anode which are immersed in an aqueous electrodeposition bath comprising the biodegradation resistant cationic electrodepositable composition described above, and substrates coated by the method.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As stated above, the present invention is directed to a biodegradation resistant cationic electrodepositable composition comprising a resinous phase dispersed in an aqueous medium. The resinous phase comprises an electrodepositable resin having cationic onium salt groups. The cationic onium salt groups are at least partially solubilized, or, where applicable, neutralized, with an α-alkoxycarboxylic acid of the Structure (I) above.

As used herein, by "biodegradation resistant electrodepositable composition" is a composition which is resistant to the growth of microorganisms such as bacteria, algae, fungi and the like, which can cause system and coating deficiencies such as those discussed above.

The acids used in preparing the electrodepositable composition of the present invention are α-alkoxycarboxylic acid of the general structure (I):

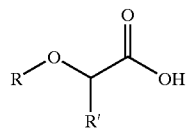

where R is $C_1$ to $C_{25}$, typically $C_1$ to $C_6$, alkyl or aryl, and R' is H or $C_1$ to $C_2$ alkyl.

By "alkyl" is meant acyclic or cyclic, linear or branched alkyl groups having a carbon chain length of from $C_1$ to $C_{25}$. Optionally, the alkyl groups can contain heteroatoms, typically oxygen or nitrogen. Nonlimiting examples of such alkyl groups include methyl, ethyl, propyl, isopropyl, and butyl groups.

The α-alkoxycarboxylic acid should be sufficiently water-soluble, so as to render the cationic resin composition dispersible in aqueous media. Nonlimiting examples α-alkoxycarboxylic acids suitable for use in the present invention include methoxyacetic acid, ethoxyacetic acid, butoxyacetic acid, phenoxyacetic acid, 2-(2-methoxyethoxy)acetic acid and 2-[2-(methoxyethoxy)ethoxy]acetic acid.

In the biodegradation resistant cationic electrodepositable composition of the present invention, the α-alkoxycarboxylic acid is used to at least partially solubilize (or, where applicable, neutralize) the cationic resin which comprises onium salt groups (e.g., ammonium, sulfonium and phosphonium groups). The degree of solubilization or neutralization depends upon the particular cationic resin included in the composition. In general, the degree of solubilization or neutralization is such that enough cationic groups are formed to provide a stable dispersion of the resin in aqueous media. By "stable dispersion" is meant one that does not settle or one that is easily redispersible if some settling occurs.

In general, the α-alkoxycarboxylic acid is used in amounts such that the electrodepositable composition typically has a pH from 5.0 to 7.0, often from 5.5 to 6.5, and such that the resinous phase will migrate to and electrodeposit on the cathode (i.e., substrate) under the voltage imposed during the electrodeposition process. As previously discussed, the α-alkoxycarboxylic acid can be used in the electrodepositable compositions of the present invention as the sole solubilizing agent for the cationic onium salt group-containing resin(s) or in conjunction with a conventional solubilizing acid.

Typically the α-alkoxycarboxylic acid(s) is used in the electrodepositable compositions of the present invention in amount sufficient to solubilize 5 to 100 percent of the cationic onium salt groups contained in the cationic resin(s). If employed, conventional solubilizing agents, for example, acetic acid, lactic acid, and/or sulfamic acids, can be used in the electrodepositable compositions of the present invention in an amount sufficient to solubilize up to 95 percent of the cationic onium salt groups contained in the cationic resin(s). In any event, the percentage of cationic onium salt groups solubilized with the α-alkoxycarboxylic acid(s) either solely or in combination with one or more conventional solubilizing agents typically is sufficient to ensure that the degree of solubilization/neutralization is at least 20 percent of the total theoretical solubilization/neutralization equivalent. As used herein and in the claims, by "solubilization" and like terms is meant both total solubilization and total neutralization, as well as partial solublization and partial neutralization.

The method by which cationic onium salt groups are formed is dependent upon the type of onium salt group desired in the cationic resin. For example, the α-alkoxycarboxylic acid can be used to at least partially solubilize a resin containing basic groups such as basic nitrogen groups. The basic nitrogen groups can be derived from the reaction of amines, such as primary or secondary amines, with epoxy groups.

Generally, the solubilization reaction can be conducted by adding the α-alkoxycarboxylic acid to the resin with agitation, and subsequently dispersing the solubilized resin into an aqueous medium. Alternatively, a solution of the α-alkoxycarboxylic acid in aqueous medium first can be prepared, and the resin can be added under agitation to the α-alkoxycarboxylic solution to form the dispersion. The solubilization reaction can take place under relatively mild conditions, at temperatures ranging from 25° C. to 70° C.

If the cationic electrodepositable resin is only partially solubilized with one or more α-alkoxycarboxylic acids, all or part of the remaining cationic onium salt groups can be solubilized with a conventional solubilizing acid, for example, lactic acid, sulfamic acid, formic acid and/or acetic acid. Because of their tendency to resist the effects of microorganism growth, inorganic acids, such as sulfamic acids, typically are employed for this purpose.

Also, for purposes of the present invention, it should be understood that any of the resinous components comprising the electrodepositable composition formulation which contain cationic salt groups can be at least partially solubilized with one or more α-alkoxycarboxylic acid such as those described above. For example, as aforementioned, in addition to the main film-forming cationic resin, cationic electrodepositable compositions often include one or more cationic salt group-containing pigment grinding resins, the cationic salt groups of which can be at least partially solubilized with one or more a-alkoxycarboxylic acids.

Additionally, it is well known in the art to use conventional acids such as those described above, to maintain the electrodeposition bath pH. Such acids can be added directly to the bath. The α-alkoxycarboxylic acids useful in the compositions of the present invention, such as those described above, can be directly added to the electrodeposition bath in addition to or in lieu of these conventional acids for this purpose.

The cationic electrodepositable resin, which usually contains active hydrogen groups, can be any suitable cationic resin known to those skilled in the art. The cationic electrodepositable resin, and, if included, a curing agent, typically constitute the main film-forming vehicle of the electrodepositable composition.

Examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin.

In one embodiment of the present invention, the cationic film-forming resins also can comprise cationic acrylic resins such as those described in U.S. Pat. Nos. 3,455,806 and 3,928,157. In an alternative embodiment of the present invention, the cationic electrodepositable resin comprises quaternary ammonium salt groups which are at least partially solubilized with an α-alkoxy carboxylic acid of structure (I) above. Non-limiting examples of these resins are those which are formed from reacting an organic polyepoxide with a tertiary amine salt. Such resins are described in U.S. Pat. Nos. 3,962,165; 3,975,346; and 4,001,101. In another embodiment of the present invention, the cationic electrodepositable resin comprises ternary sulfonium salt groups which are at least partially solubilized with an α-alkoxy carboxylic acid of the structure (I) above. In yet another embodiment of the present invention, the electrodepositable cationic resin comprises quaternary phosphonium salt-groups. Such resins are described in U.S. Pat. Nos. 3,793,278 and 3,984,922, respectively. The quaternary phosphonium salt groups are then at least partially solubilized with the α-alkoxycarboxilyc acids described above. Also useful are the film-forming resins which cure via transesterification such as described in European Application No. 12463. Further, cationic compositions prepared from Mannich bases such as described in U.S. Pat. No. 4,134,932 can be used.

The cationic electrodepositable resin described above can be present in the electrodeposition bath of the invention in amounts ranging from 1 to 60 percent by weight, typically 5 to 25 based on total weight of the electrodeposition bath.

As mentioned above, the resinous phase of the electrodeposition bath of the present invention can further comprise a curing agent adapted to react with the active hydrogen groups of the cationic electrodepositable resin described immediately above. Blocked polyisocyanate curing agents typically are used. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein. By "blocked" is meant that the isocyanate groups have been reacted with a blocking agent so that the resultant blocked isocyanate group is stable to active hydrogens at ambient temperature but reactive with active hydrogens in the film forming polymer at elevated temperatures, usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 5 percent to 60 percent by weight, preferably from 20 percent to 50 percent by weight, the percentages based on the total weight of the resin solids of the electrodeposition bath.

The aqueous compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from 2 to 60 percent by weight based on total weight of the aqueous dispersion. When the compositions of the present invention are in the form of resin concentrates, they generally have a resin solids content of 20 to 60 percent by weight based on weight of the aqueous dispersion.

Electrodeposition baths of the invention are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids and corrosion inhibitors. Electrodeposition bath components (1) and (2) are dispersed in an aqueous medium which comprises water and, usually, coalescing solvents.

The electrodeposition bath of the present invention has a resin solids content usually within the range of 5 to 25 percent by weight based on total weight of the electrodeposition bath.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents, corrosion inhibitors, such as the soluble salts of bismuth or lead, or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The electrodepositable coating compositions of the present invention can be applied by electrodeposition to a variety of electroconductive substrates especially metals such as untreated steel, galvanized steel, conductive carbon coated materials, and aluminum. The applied voltage for electrodeposition may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures such as 90° to 260° C. for 1 to 40 minutes.

Illustrating the invention are the following examples which are not to be considered as limiting the invention to their details. Unless otherwise indicated, all parts and percentages in the following examples, as well as throughout the specification, are by weight.

EXAMPLES

Example 1 describes the preparation of a cationic electrodepositable composition of the present invention. Part 1A describes the preparation of a cationic resin which was solubilized with methoxyacetic acid. Part 1B describes the preparation of an electrodepositable composition comprising the solubilized cationic resin of 1A. Comparative Example 2 describes the preparation of a conventional cationic electrodepositable composition. Part 2A describes the preparation of a cationic resin which was solubilized with lactic acid. Part 2B describes the preparation of a comparative electrodepositable composition comprising the resin of Part 2A.

Example 1

Part A: This example describes the preparation of a cationic electrodepositable resin which was partially solubilized with methoxyacetic acid. The resin was prepared from a mixture of the following ingredients.

| Ingredients | Parts by weight |
|---|---|
| EPON ® 880[1] | 614.68 |
| Bisphenol A-ethylene oxide adduct (⅙ molar ratio) | 125 |
| Bisphenol A | 265.42 |
| Methyl isobutyl ketone | 20.51 |
| Ethyltriphenyl phosphonium iodide | 0.6 |
| Bisphenol A-ethylene oxide adduct (⅙ molar ratio) | 125 |
| Methylisobutyl ketone | 85.53 |
| Crosslinker[2] | 718.3 |
| Diketimine[3] | 57.01 |
| N-methyl ethanolamine | 48.68 |

[1]Diglycidyl ether of Bisphenol A, commercially available from Shell Oil and Chemical Co.
[2]Prepared by reacting 10 equivalents of polymeric MDI (Rubinate M, available from Huntsman Corporation) with 2 equivalents of 2-(2-butoxyethoxy)ethanol and 8 equivalents of 2-butoxyethanol using dibutyl tin dilaurate as a catalyst (89% solids in methyl isobutyl ketone).
[3]Diketimine derived from diethylenetriamine and methyl isobutyl ketone (73% solids in methyl isobutyl ketone).

The EPON® 828, the initial charge of Bisphenol A-ethylene oxide adduct, Bisphenol A, and the initial charge of methyl isobutyl ketone were added to a suitable reaction vessel and heated in a nitrogen atmosphere to a temperature of 125° C. Ethyltriphenyl phosphonium iodide then was added and the reaction mixture was allowed to exotherm to about 145° C. The reaction was held at 145° C. for 2 hrs at which time the second charge of Bisphenol A-ethylene oxide adduct was added and an epoxy equivalent was obtained. The second charge of methyl isobutyl ketone, crosslinker, diketimine and N-methylethanolamine then were added in succession. The admixture was allowed to exotherm until a temperature of 100° C. was established and held at that temperature for 1 hour. The resin mixture thus obtained (1700 parts) was dispersed in aqueous medium by combining with a mixture of 28.75 parts of methoxyacetic acid, 7.93 parts of sulfamic acid and 1081 parts of deionized water. The dispersion was further diluted with 626 parts of deionized water and 634 parts of deionized water in successive stages then vacuum stripped to remove organic solvent. The resultant dispersion had a solids content of 41.37 percent.

Part B: This example describes the preparation of an electrodeposition bath containing the methoxyacetic acid solubilized resin of Part A. The electrodeposition bath was prepared by combining the following ingredients under agitation:

| Ingredients | Parts by weight |
|---|---|
| Resin from Example 1A | 1310.4 |
| Flexibilizer[1] | 160.3 |
| Plasticizer[2] | 27.7 |
| Flow Control Additive[3] | 72.2 |
| Phenylphosphonic acid | 0.4 |
| Pigment paste[4] | 234.5 |
| Deionized water | 1994.5 |

[1]Prepared as described in Example 2A in U.S. Pat. No. 6,017,431, with lactic replacing sulfamic acid.
[2]Reaction product of 2 moles of diethylene glycol butyl ether and 1 mole of formaldehyde, prepared as generally described in U.S. Pat. No. 4,891,111.
[3]Prepared as described in Examples A and B of U.S. Pat. No. 5,096,556 with sulfamic acid substituted for acetic acid, and butylcarbitol formal substituted for ethylene glycol butyl ether.
[4]Pigment and catalyst paste available from PPG Industries, Inc. as E6251.

Comparative Example 2

Part A: This comparative example describes the preparation of an electrodepositable cationic resin partially solubilized with lactic acid. The resin was prepared as described above in Example 1A, except the methoxyacetic acid was replaced with 32.6 parts 88% aqueous lactic acid solution.

Part B: This comparative example describes the preparation of an electrodeposition bath containing the lactic acid solubilized resin of Part A immediately above. The electrodeposition bath was prepared by combining the following ingredients with agitation:

| Ingredients | Parts by weight |
|---|---|
| Resin of Example 2A | 1248.2 |
| Flexibilizer of Example 1B | 160.3 |
| Plasticizer of Example 1B | 27.7 |
| Flow Control Additive of Example 1B | 72.2 |
| Phenylphosphonic acid | 0.4 |
| Pigment paste of Example 1B | 234.5 |
| Deionized water | 2056.7 |

The electrodeposition bath compositions of Example 1B and Comparative Example 2B above were ultrafiltered 30% and reconstituted with deionized water. The pH and conductivity of each bath was measured using an Accumet® Model 50 pH/conductivity meter. Phosphated steel test panels (supplied by ACT Laboratories and labeled as "C700 No Chemseal, Immersion DIW"), were electrocoated at 90° F. (32.2° C.) for two minutes at 175–200 volts to yield films having a drg film thickness (DFT) of approximately 1 mil (25.4 micrometers) after curing the coated test panels for 20 minutes at 350° F. (177° C.). Appearance of the test panels thus prepared was determined by visual inspection to be equivalent for Example 1 and Comparative Example 2.

TABLE 1

| | pH | Conductivity | Volts | DFT (mils/micrometers) |
|---|---|---|---|---|
| Example 1B | 6.13 | 1210 | 175 | 0.95/23.8 |
| Comparative Example 2B | 6.25 | 1120 | 200 | 0.97/24.3 |

Bacteria resistance of the above-described electrodeposition bath compositions and the enumeration of the bacteria is described as follows:
Bacteria Resistance Testing Infected rinsewater from an online electrodeposition bath tank (containing E6100, commercially available from PPG Industries, Inc.) having a bacterial count of $1.5 \times 10^6$ cfu/mL was used to inoculate filter-sterilized ultrafiltrate ("permeate") collected from the same line. The infected rinsewater was diluted by a factor of $10^3$ into the sterile permeate. The infected permeate was added to reactors. The various acids listed below in the following Table 2 were prepared as 1% solutions in water and tested at 1000, 500, and 200 ppm of active material. Reactors were rolled for 10 days at 32° C. and were plated for bacteria counts at 3, 7, and 10 days.
Enumeration of Bacteria The enumeration of aerobic heterotrophs in the reactors utilized the standard spread plate method as described in *Standard Methods for the Examination of Water and Wastewater*, 1992, section 9215C. Bacterial counts were examined using R2A agar plates. 100 $\mu$L of a suitable dilution of sample was pipetted onto the surface of the media and spread with an alcohol and flame sterilized glass rod. The plates were inverted and incubated for 3 days at 32° C. with periodic examination. Colony forming units were counted on a New Brunswick Bactronic Colony Counter. A target of 30 to 300 cfu per plate was considered a valid count.

TABLE 2

| | | Bacteria Count | | |
|---|---|---|---|---|
| Acid | Concentration | 3 day | 7 day | 10 day |
| Methoxyacetic | 1000 | $<4.0 \times 10^1$ | $<4.0 \times 10^1$ | $<4.0 \times 10^1$ |
| | 500 | $<4.0 \times 10^1$ | $<4.0 \times 10^1$ | $<4.0 \times 10^1$ |
| | 200 | $<4.0 \times 10^1$ | $<4.0 \times 10^2$ | $<4.0 \times 10^1$ |
| Ethoxyacetic | 1000 | $<4.0 \times 10^1$ | $<4.0 \times 10^1$ | $<4.0 \times 10^1$ |
| | 500 | $<4.0 \times 10^1$ | $<4.0 \times 10^1$ | $<4.0 \times 10^1$ |
| | 200 | $1.3 \times 10^6$ | $3.2 \times 10^7$ | $4.8 \times 10^7$ |
| Butoxyacetic | 1000 | $<4.0 \times 10^1$ | $<4.0 \times 10^1$ | $<4.0 \times 10^1$ |
| | 500 | $<4.0 \times 10^1$ | $<4.0 \times 10^1$ | $<4.0 \times 10^1$ |
| | 200 | $3.0 \times 10^6$ | $1.2 \times 10^7$ | $5.6 \times 10^7$ |
| Phenoxyacetic | 1000 | $<4.0 \times 10^1$ | $<4.0 \times 10^1$ | $<4.0 \times 10^1$ |
| | 500 | $<4.0 \times 10^1$ | $<4.0 \times 10^1$ | $<4.0 \times 10^1$ |
| | 200 | $4.0 \times 10^6$ | $8.0 \times 10^6$ | $3.2 \times 10^7$ |
| 2-(2-methoxyethoxy)acetic | 1000 | $<4.0 \times 10^1$ | $<4.0 \times 10^1$ | $<4.0 \times 10^1$ |
| | 500 | $<4.0 \times 10^1$ | $>1.2 \times 10^4$ | $4.0 \times 10^6$ |
| | 200 | $8.0 \times 10^6$ | $2.8 \times 10^7$ | $2.3 \times 10^7$ |
| 2-[2-(2-methoxyethoxy)-ethox]acetic | 1000 | $<4.0 \times 10^1$ | $<4.0 \times 10^1$ | $<4.0 \times 10^1$ |
| | 500 | $<4.0 \times 10^1$ | $>1.2 \times 10^4$ | $6.4 \times 10^6$ |
| | 200 | $3.2 \times 10^6$ | $4.0 \times 10^7$ | $5.2 \times 10^7$ |
| Lactic | 1000 | $2.4 \times 10^7$ | $5.0 \times 10^7$ | $2.3 \times 10^7$ |
| | 500 | $7.2 \times 10^7$ | $7.8 \times 10^7$ | $2.4 \times 10^7$ |
| No Addition | NA | $7.5 \times 10^6$ | $2.4 \times 10^6$ | $1.1 \times 10^7$ |

The data presented in Table 2 above illustrate that α-alkoxycarboxylic acids, such as those used in the electrodepositable compositions of the present invention, retard the growth of bacteria, particularly at levels of 500 ppm or greater, as compared to lactic acid.

It will be appreciated by those skilled in the art that changes could be made to the embodiments described above without departing from the broad invention concept thereof. It is understood, therefore, that this invention is not limited to the particular embodiments disclosed, but it is intended to cover modifications which are within the spirit and scope of the invention, as defined by the appended claims.

We claim:

1. A biodegradation resistant cationic electrodepositable composition comprising a resinous phase dispersed in an aqueous medium, said resinous phase comprising an electrodepositable resin having cationic onium salt groups, said onium salt groups having been at least partially solubilized with an α-alkoxycarboxylic acid of the following formula (I):

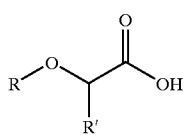

where R is $C_1$ to $C_6$ alkyl or aryl and R' is H or $C_1$ to $C_2$ alkyl.

2. The composition of claim 1, where R is selected from methyl, ethyl, propyl, butyl, phenyl, 2-(2-methoxyethyl), 2-(n-butoxyethyl) and 2-[2-(2-methoxyethoxy)ethyl], and R' is selected from H, methyl and ethyl.

3. The composition of claim 1, wherein the α-alkoxycarboxylic acid is selected from methoxyacetic acid, ethoxyacetic acid, butoxyacetic acid, phenoxyacetic acid, 2-(2-methoxyethoxy)acetic acid and 2-[2-(2-methoxyethoxy)ethoxy]acetic acid.

4. The composition of claim 1, wherein the electrodepositable resin is present in an amount ranging from 1 to 60 percent by weight based on total weight of the electrodepositable composition.

5. The composition of claim 1, wherein the cationic onium salt groups are selected from ammonium, quaternary ammonium, sulfonium, and phosphonium salt groups.

6. The composition of claim 5, wherein the cationic onium salt comprises an ammonium salt formed from the at least partial solubilization of basic nitrogen groups.

7. The composition of claim 6, wherein the basic nitrogen groups comprise primary amine groups.

8. The composition of claim 6, wherein the electrodepositable resin comprises the reaction product of an epoxide group-containing polymer and a secondary amine which contains ketimine groups.

9. The composition of claim 6, wherein the electrodepositable resin comprises the reaction product of an epoxide group-containing resin and a primary or secondary amine.

10. The composition of claim 5, wherein the electrodepositable resin comprises an onium group-containing acrylic polymer.

11. The composition of claim 5, wherein the onium salt comprises a quaternary ammonium salt group.

12. The composition of claim 5, wherein the onium salt comprises a ternary sulfonium salt group.

13. The composition of claim 5, wherein the onium salt comprises a quaternary phosphonium salt group.

14. The composition of claim 1, wherein the electrodepositable resin comprises active hydrogen-containing groups.

15. The composition of claim 14, further comprising a blocked polyisocyanate curing agent.

16. A biodegradation resistant cationic electrodepositable composition comprising a resinous phase dispersed in an aqueous medium, said resinous phase comprising an electrodepositable polyepoxide polymer having cationic ammonium salt groups formed from the at least partial solubilization of basic nitrogen groups with an α-alkoxycarboxylic acid selected from methoxyacetic acid, ethoxyacetic acid, butoxyacetic acid, phenoxyacetic acid, 2-(2-methoxyethoxy)acetic acid and 2-[2-(2-methoxyethoxy)ethoxy]acetic acid.

17. A method for coating a conductive substrate serving as a cathode in an electrical circuit comprising said cathode and an anode immersed in an aqueous biodegradation resistant cationic electrocoating composition, the method comprising passing electric current between said anode and said cathode so as to cause the electrocoating composition to deposit as a substantially continuous coating on the cathode, characterized in that the biodegradation resistant electrocoating composition comprises a resinous phase dispersed in an aqueous medium, said resinous phase comprising an electrodepositable resin having cationic onium salt groups, said onium salt groups having been at least partially solubilized with an α-alkoxycarboxylic acid of the formula (I):

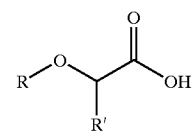

where R is $C_1$ to $C_6$ alkyl or aryl and R' is H or $C_1$ to $C_2$ alkyl.

18. The method of claim 17, where R is selected from methyl, ethyl, propyl, butyl, phenyl, 2-(2-methoxyethyl), 2-(n-butoxyethyl) and 2-[2-(2-methoxyethoxy)ethyl], and R' is selected from H, methyl and ethyl.

19. The method of claim 17, wherein the α-alkoxycarboxylic acid is selected from methoxyacetic acid, ethoxyacetic acid, butoxyacetic acid, phenoxyacetic acid, 2-(2-methoxyethoxy)acetic acid and 2-[2-(2-methoxyethoxy)ethoxy]acetic acid.

20. The method of claim 17, wherein the electrodepositable resin is present in an amount ranging from 1 to 60 percent by weight based on total weight of the electrodepositable composition.

21. The method of claim 17, wherein the cationic onium salt groups are selected from ammonium, quaternary ammonium, sulfonium and phosphonium salt groups.

22. The method of claim 21, wherein the cationic onium salt comprises an ammonium salt formed from the at least partial solubilization of basic nitrogen groups.

23. The method of claim 22, wherein the basic nitrogen groups comprise primary amine groups.

24. The method of claim 22, wherein the electrodepositable resin comprises the reaction product of an epoxide group-containing polymer and a secondary amine which contains ketimine groups.

25. The method of claim 22, wherein the electrodepositable resin comprises the reaction product of an epoxide group-containing polymer and a primary or secondary amine.

26. The method of claim 21, wherein the electrodepositable resin comprises an onium group-containing acrylic polymer.

27. The method of claim 21, wherein the onium salt groups comprise quaternary ammonium salt groups.

28. The method of claim 21, wherein the onium salt groups comprise ternary sulfonium salt groups.

29. The method of claim 21, wherein the onium salt groups comprise quaternary phosphonium salt groups.

30. The method of claim 17, wherein the electrodepositable resin comprises active hydrogen-containing groups.

31. The method of claim 30, wherein the electrodepositable composition further comprises a blocked polyisocyanate curing agent.

32. A method for coating a conductive substrate serving as a cathode in an electrical circuit comprising said cathode and an anode immersed in an aqueous biodegradation resistant cationic electrocoating composition, the method comprising passing electric current between said anode and said cathode so as to cause the electrocoating composition to deposit as a substantially continuous coating on the cathode, characterized in that the biodegradation resistant electrocoating composition comprises a resinous phase dispersed in an aqueous medium, said resinous phase comprising an electrodepositable polyepoxide polymer having cationic ammonium salt groups formed from the at least partial solubilization of basic nitrogen groups with an α-alkoxycarboxylic acid selected from methoxyacetic acid, ethoxyacetic acid, butoxyacetic acid, phenoxyacetic acid, 2-(2-methoxyethoxy)acetic acid and 2-[2-(2-methoxyethoxy)ethoxy]acetic acid.

* * * * *